United States Patent [19]

Winn

[11] 4,371,776
[45] Feb. 1, 1983

[54] WELDING POWER SUPPLY

[75] Inventor: Jackie L. Winn, Florence, S.C.

[73] Assignee: Union Carbide Corporation, Danbury, Conn.

[21] Appl. No.: 277,729

[22] Filed: Jun. 26, 1981

[51] Int. Cl.³ .............................................. B23K 9/09
[52] U.S. Cl. .............................. 219/130.51; 219/130.32
[58] Field of Search ............. 219/130.51, 130.5, 130.1, 219/130.31, 130.32, 137 PS

[56] References Cited

U.S. PATENT DOCUMENTS 4,038,515 0/1977 Risberg ..................... 219/130.51

FOREIGN PATENT DOCUMENTS

23348 2/1981 European Pat. Off. .
54-121255 9/1979 Japan ............................ 219/130.51
55-5185 1/1980 Japan ............................ 219/130.51

*Primary Examiner*—C. C. Shaw
*Attorney, Agent, or Firm*—E. Lieberstein

[57] ABSTRACT

A controllable A.C power supply for supplying quasi square waves of alternating current to a welding arc between an electrode and a metal workpiece such as aluminum, aluminum alloys and the like comprising a first controllable alternately conducting current path for providing for current flow from the electrode to the workpiece; a second controllable alternately conducting current path for providing for current flow from the workpiece to the electrode; inductor means connect in the first and second current paths for accumulating and dissipating energy to maintain the square waves of current; and commutating means for forcibly rendering the second current path nonconductive whereby energy stored in the inductor means provides a voltage sufficient to reestablish the welding current flow from the electrode to the workpiece.

9 Claims, 10 Drawing Figures

WELDING POWER SUPPLY

This invention relates to an apparatus for providing a welding current from a single phase A.C. electrical power source. More particularly, this invention relates to an apparatus for providing a quasi-square wave welding current with a stabilized welding arc particulary useful for AC TIG welding of aluminum, aluminum alloys and similiar metals.

BACKGROUND OF THE INVENTION

Tungsten inert gas (TIG) or gas tungsten arc welding (GTAW) of aluminum, aluminum alloys and similar metals is well know in the art and is discussed, for example, in the *Welding Handbook*, Volume Two, Seventh Edition, 1978, of the American Welding Society. In A.C. TIG welding, a problem well known to the art is that the electrode and the metal workpiece have different abilities to emit electrons. The electrode emits electrons more readily than the metal workpiece, especially for aluminum, aluminum alloys and similar metals. Thus, during the A.C. current half cycle wherein the welding arc is maintained by electron flow from the electrode (electrode negative) to the workpiece (referred to in the art as the straight polarity or weld half cycle) there is little resistance caused by the characteristics of the electrode or the workpiece to the formation or maintenance of the arc. In contrast, during the A.C. current half cycle wherein the welding arc is maintained by electron flow from the workpiece to the tungsten electrode (referred to in the art as the reverse polarity or clean half cycle) the tendency of the workpiece, particularly aluminum or aluminum alloys, to poorly emit electrons frequently results in non conduction or poor conduction of the current during this half cycle. This phenomena is referred to as arc rectification and results in poor quality welds. Accordingly, the art has sought welding current supplies which will reliably and inexpensively solve this problem of arc rectification and provide a stablizied welding arc for TIG A.C. arc welding of aluminum, aluminum alloys and similiar metals.

In the art of TIG A.C. arc welding of aluminum, aluminum alloys and similar metals, it is desirable for the welding current waveform to approach a square waveform because the rapid zero crossing time reduces arc outages during crossover therefore enhancing ignition of the opposite polarity. Also, the ratio of peak current to RMS current is reduced therefore allowing a given electrode to be used at higher RMS currents without tungsten splitting.

As used herein, positive current means that the electrode is positive with respect to the work (reverse polarity). Negative current means that the electrode is negative with respect to the work (straight polarity).

Furthermore, it is desirable that the welding power supply have the capability to vary the width or time period of adjacent pairs of positive (reverse polarity) and negative (straight polarity) current half cycles. If the width or time period for the straight polarity current half cycle is greater than the time period or width for the adjacent reverse polarity current half cycle, greater penetration of the workpiece for a given current may be achieved if this is desired. If the width or time period for the reverse polarity half cycle is greater than the width or time period for the adjacent straight polarity current half cycle, greater cleaning may be achieved if this is desired. That is, it is desirable that the welding power supply permits the essentially square wave current adjacent half cycles to be made unsymmetrical in width wherein the sum of the widths of adjacent pairs of positive and negative half cycles equal 360° of the line voltage frequency.

An attempted prior art solution to the problem of arc rectification in TIG A.C. welding is described in U.S. Pat. No. 4,038,515—Risberg. In U.S. Pat. No. 4,038,515, an SCR controllable full wave rectifier bridge is connected at its A.C. or external terminals in series between the output terminal of a transformer and the welding electrode. An inductor is connected across the D.C. or internal terminals of the bridge. This inductor provides an energy storage source to induce an arc current and acts as a filter to provide a quasi square wave arc current.

A problem arises in this attempted prior art solution when attempting to switch the current flow from straight to reverse polarity. When the bridge is operated to cause this current reversal, free-wheeling of the inductor connected in the bridge occurs. The power source voltage is suppose to provide for electron flow from the aluminum workpiece to the tungsten electrode to provide a reverse current to back bias two of the SCR's in the bridge and end the free-wheeling. In practice, the aluminum workpiece does not want to emit electrons. Hence, this prior art solution will frequently fail to reestablish the arc upon switching from straight to reverse polarity and thus results in an unstable arc.

In order to overcome this problem, the art will use high frequency starting mode voltage in order to force conduction of electrons from the aluminum workpiece to the tungsten electrode upon the switching of the welding current from straight to reverse polarity. While this improves the performance of this prior art power supply, arc rectification can still occur upon the switching which degrades the quality of the resulting weld.

OBJECT OF THE INVENTION

It is therefore an object of the present invention to provide a power supply for A.C. TIG welding of aluminum, aluminum alloys and similiar materials which provides a stable welding arc between the electrode and the workpiece.

It is a further object of the present invention to provide a power supply for A.C. TIG welding of aluminum, aluminum alloys and similar materials which self stabilizes the welding arc between the electrode and the workpiece.

It is yet a further object of the present invention to provide a power supply for AC TIG welding of aluminum, aluminum alloys and similar materials which achieves improved quality welds by self stabilizing the welding arc between the electrode and the workpiece.

It is still a further object of the present invention to provide a power supply for AC TIG arc welding of aluminum, aluminum alloys, and similiar materials which self stablizes the welding arc, provides a welding current with an essentially square waveform and permits the essentially square wave current adjacent half cycles to be made unsymmetrical in width wherein the sum of the widths of adjacent pairs of positive and negative half cycles equal 360° of the line voltage frequency.

These and other objects will be apparent from the following description and claims in conjunction with the drawings.

As used herein, stating that the power supply self stabilizes the welding arc means the source of welding current causes the welding arc to be stable by forcing conduction of electrons from the workpiece to the electrode during switching of the current from straight to reverse polarity.

SUMMARY OF THE INVENTION

The present invention may be generally summarized as a controllable power supply for supplying quasi square waves of alternating current to a welding arc between an electrode and a workpiece comprising:

a transformer including a primary winding for receiving a single phase A.C. current from a single phase A.C. power source and at least one secondary winding;

a first welding current path established between opposite ends of said secondary winding which is nonconductive for current flow from said workpiece to said electrode and having switching means for selectively rendering said first current path conductive for current flow from said electrode to said workpiece;

a second welding current path established between opposite ends of said secondary winding which is nonconductive for current flow from said electrode to said workpiece and having switching means for selectively rendering said second current path conductive for current flow from said workpiece to said electrode;

control means for triggering said first current path switching means for said rendering of said first current path conductive at a selected non-zero value of a positive polarity half cycle of the source voltage when said welding current is flowing from said workpiece to said electrode in said second current path and said first current path is nonconductive;

control means for triggering said second current path switching means for said rendering of said second current path conductive at a selected non-zero value of a negative polarity half cycle of the source voltage when said welding current is flowing from said electrode to said workpiece in said first current path and said second current path is nonconductive;

means for rendering said first current path nonconductive operating substantially simultaneously with said selective triggering of said second current path switching means;

wherein said control means renders said first and second current paths alternately conducting at each adjacent positive and negative polarity half cycle of the source voltage for supplying current in respectively opposite and mutually exclusive polarities to said arc;

inductor means connected in said first and second current paths such that when current is flowing from said electrode to said workpiece in said first current path said inductor means accumulates energy when the voltage across said opposite ends of said first current path secondary winding is greater than the welding arc voltage and dissipates accumulated energy when the voltage across said opposite ends of said first current path secondary winding is less than the welding arc voltage for self-inducing voltage to maintain current flow from said electrode to said workpiece and when current is flowing from said workpiece to said electrode in said second current path said inductor means accumulates energy when the voltage across said opposite ends of said second current path secondary winding is greater than the welding arc voltage and dissipates accumlated energy when the voltage across said opposite ends of said second current path secondary winding is less than the welding arc voltage for self-inducing voltage to maintain current flow from said workpiece to said electrode;

wherein the energy accumulated by said inductor means substantially equals the energy dissipated by said inductor means over a 360° cycle of said source voltage; the improvement which comprises:

commutating means for selectively rendering said second current path nonconductive whereby said inductor means accumulated energy provides a voltage across said electrode and said workpiece sufficient for reestablishing current flow from said electrode to said workpiece; and control means for initiating said selective operation of said commutating means substantially simultaneously with said selective triggering of said first current path switching means.

In a preferred embodiment of the present invention the inductor means comprising a first winding in the first welding current path and a second winding in the second welding current path wherein the first and second windings are wound on a common core such that the coefficient of coupling between the inductance of the first winding and the inductance of the second winding is substantially one and such that a current flowing in the first welding current path provides a magnetic flux having the same direction as a magnetic flux provided by a current flowing in the second welding current path.

In the preferred embodiment of the present invention the first welding current path switching means includes one thyristor; the second welding current path switching means includes one thyristor; with the commutating means being connected across the second welding current path thyristor cathode to anode.

DESCRIPTION OF THE PREFERRED EMBODIMENTS

In order to afford a complete understanding of the present invention and an appreciation of its advantages, a description of the preferred embodiments is presented below.

Figure 1:
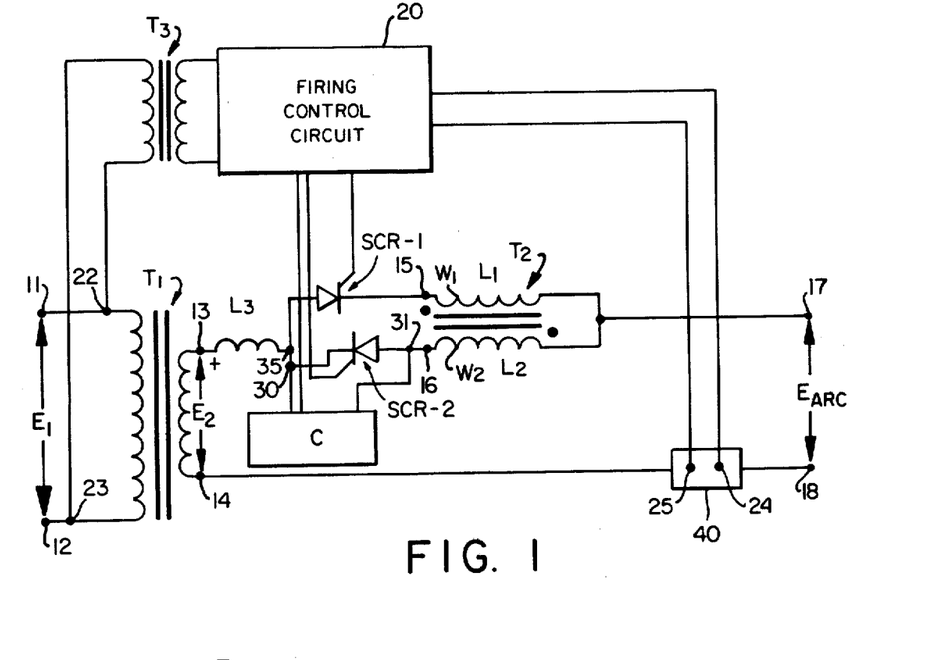
FIG. 1 is a schematic circuit diagram of a preferred embodiment of the welding power supply in accordance with the present invention.

With reference to the drawings, FIG. 1 illustrates a schematic circuit diagram of a preferred embodiment of the power supply of the present invention for AC TIG welding. A single phase AC power source is connected across primary or input terminals 11 and 12 of a step-down welding transformer $T_1$, which produces across the secondary or output terminals 13 and 14 a voltage $E_2$ which is in phase reference with the A.C. power source voltage $E_1$ across terminals 11 and 12.

Connected in series with one terminal of the output of transformer $T_1$ is a first side of an inverse parallel SCR circuit comprising thyristors SCR-1 and SCR-2. In the embodiment of FIG. 1, the anode of thyristor SCR-1 and the cathode of thyristor of SCR-2 are common and connected in series with output terminal 13 of transformer $T_1$. The cathode of SCR-1 and the anode of SCR-2 of the second side of the inverse parallel SCR circuit are each connected to an individual inductor means wherein each of the two inductors $L_1$ and $L_2$ have a substantially equal inductance and the mutual inductance $L_m$ between inductors $L_1$ and $L_2$ substantially equals the inductance of each of the individual inductors $L_1$ and $L_2$.

In the embodiment of FIG. 1, the cathode of thyristor SCR-1 is connected in series to a first end of first inductor $L_1$ at 15 and the anode of thyristor SCR-2 is connected in series to a first end of second inductor $L_2$ at 16. The second end of first inductor $L_1$ and the second end of second inductor $L_2$ are each connected to electrode terminal 17. The work to be welded is connected at terminal 18 in series with output or secondary terminal 14 of transformer $T_1$. The welding arc is thus formed between terminals 17 and 18 and the voltage of the arc is designated $E_{arc}$.

Referring to inductors $L_1$ and $L_2$, the inductances of $L_1$ and $L_2$ are substantially equal. That is, it may be said for purposes of analysis that:

$$L_1 = L_2 = L$$

The coefficient of coupling k between inductors $L_1$ and $L_2$ is substantially 1 and accordingly, the mutual inductance, $L_m$, of inductors $L_1$ and $L_2$ would be:

$$L_m = k \sqrt{L_1 \times L_2}$$

$$L_m = L$$

and thus the mutual inductance, $L_m$, between inductors $L_1$ and $L_2$ substantially equals the inductance L of the individual inductors $L_1$ and $L_2$.

In order to achieve a coefficient of coupling substantially equal to 1 (i.e., the total flux of one inductor is linked to a second inductor), the turns of the inductor coils $W_1$ and $W_2$ would be, for example, on the same core of a material having a high relative magnetic permeability.

Inductors $L_1$ and $L_2$ are arranged so that the current flow through windings $W_1$ of inductor $L_1$ will produce a magnetic flux field that links with windings $W_2$ of inductor $L_2$ in a manner such that the linked flux field has the same direction with respect to inductor $L_2$ as the magnetic flux field produced by current flow through $L_2$. Similarly, the current flow through inductor $L_2$ will produce a magnetic field that links with inductor $L_1$ in a manner such that the linked flux field has the same direction with respect to inductor $L_1$ as the magnetic flux field produced by current flow through inductor $L_1$.

Stated otherwise, the direction of the magnetic flux field with respect to inductor $L_1$ produced by current flow in inductor $L_1$ is to be the same as the direction of the magnetic flux field linked to inductor $L_1$ which is produced by current flow in inductor $L_2$ and vice versa.

Figure 2:
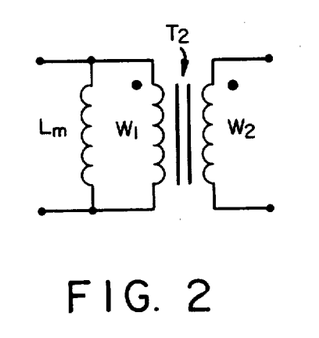
FIG. 2 is a schematic equivalent ideal transformer circuit diagram of the cummutating transformer of the power supply in accordance with the present invention as illustrated in FIG. 1.

The requirements for inductors $L_1$ and $L_2$ as set forth in the foregoing may be advantageously achieved by an appropriately would gapped core transformer wherein the ratio of the windings $W_1$ and $W_2$ is 1:1. The equivalent circuit for such a transformer is illustrated in FIG. 2 as an ideal transformer and it is schematically represented as $T_2$ in FIG. 1. Transformer $T_2$ would be referred to in the art as a commutating transformer.

Figure 3:
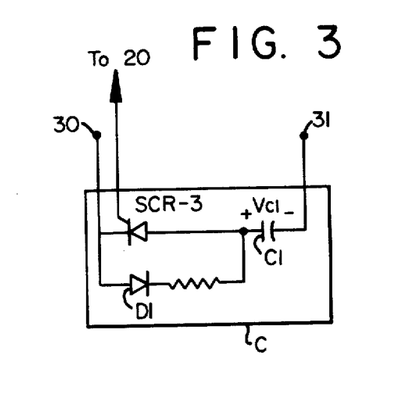
FIG. 3 is a schematic circuit diagram of a commutating circuit means suitable for use in the preferred embodiment of the welding power supply in accordance with the present invention as illustrated in FIG. 1.

The thyristors SCR-1 and SCR-2 are selectively fired or rendered conducting by means of firing pulses to their respective gates provided by a suitable firing control circuit means 20 as hereinafter described. SCR-2 is forcibly back biased or rendered non conducting by commutating circuit means C which is also advantageously controlled by firing control circuit means 20 as hereinafter described. A preferred commutating circuit means C is illustrated in FIG. 3 and is of the type described in the SCR Manual, sixth edition, General Electric, 1979, page 352. Other commutating circuit means may be used by one skilled in the art.

Figure 4:
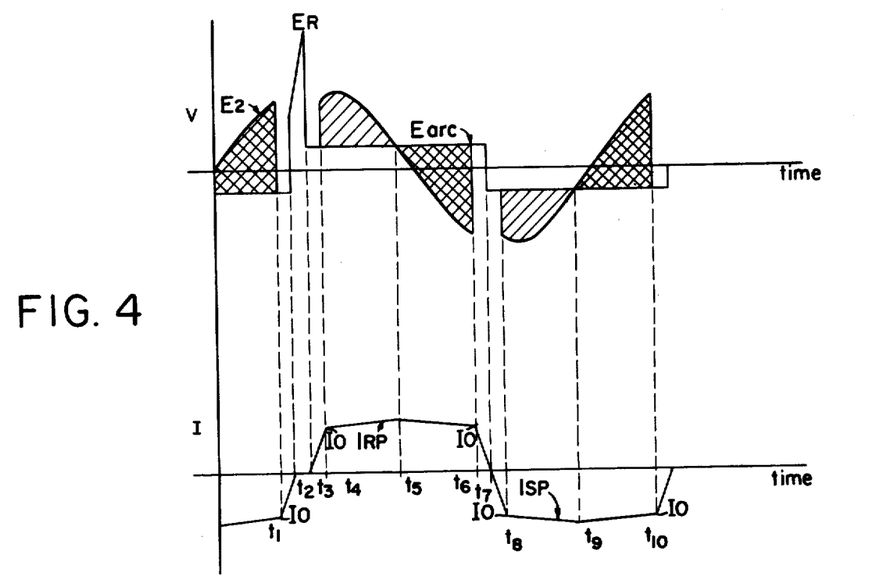
FIG. 4 is a graph showing various waveforms explanatory of the operation of the preferred embodiment of the A.C. welding supply in accordance with the present invention as illustrated in FIG. 1.

In typical operation of the circuit of FIG. 1 and with reference to the waveforms illustrated in FIG. 4, thyristors SCR-1 and SCR-3 are fired by firing control circuit means 20 at time $t_1$ of secondary voltage waveform $E_2$. Steady state operation is assumed. That is, thyristor SCR-2 had been conducting immediately preceding time $t_1$ and energy and volt-seconds stored in mutual inductance $L_m$ of commutating transformr $T_2$ had been inducing sufficient voltage across winding $W_2$ of commutating transformer $T_2$ to maintain straight polarity (electrode negative) welding current flow ($I_{sp}$) in opposition to the A.C. power supply voltage $E_2$ which is positive at time $t_1$. At time $t_1$ the amplitude of the welding current I is $I_o$.

At time $t_1$ when SCR-3 is fired, the voltage across capacitor $C_1$ (FIG. 3) is of positive polarity and by firing SCR-3 is applied across SCR-2 cathode (terminal 30) to anode (terminal 31) and therefore reverse biases SCR-2. The firing of SCR-3 also provides a current path in parallel to SCR-2 for diverting current flow from SCR-2. That is, a current path is provided across SCR-2 via terminal 31, capacitor $C_1$, SCR-3, and terminal 30 parallel to the current path through SCR-2. By reverse biasing SCR-2 and diverting current flow, SCR-2 is rendered non-conducting.

Accordingly, the firing of SCR-1 and SCR-3 substantially simultaneously at time $t_1$ provides a current path around the loop SCR-1, $W_1$, $W_2$, C1, and SCR-3 about which the current being induced by the mutual inductance $L_m$ of commutating transformer $T_2$ will flow or freewheel.

Upon the firing of SCR-1 and SCR-3 at time $t_1$, the energy stored in the leakage reactance of step down transformer $T_1$, illustrated as $L_3$ in FIG. 1, will induce a voltage to oppose the net voltage drop $V_{13-35}$ and attempt to maintain the flow of the welding current I. Since the energy storage capacity of leakage reactance $L_3$ is small, the welding arc current will rapidly ramp from $I_o$ to zero in the time interval $t_1$ to $t_2$.

The slope of the current ramp during the time interal $t_1-t_2$ is given by:

$$di/dt = (E_2 + E_{arc} - \tfrac{1}{2}V_{c1}/L_3)$$

As the weld current ramps to zero, the energy and volt-seconds of $L_m$ (much greater than $L_3$) must be conserved. Therefore, a free-wheeling current $I_f$ will begin to flow around current path SCR-1, $W_1$, $W_2$, C1 and SCR-3.

At time $t_2$, the weld arc current is substantially zero and the voltage across the welding arc terminals 17 (electrode) and 18 (work) is equal to $E_2 - \tfrac{1}{2} V_{c1}$. The welding arc current does not readily reignite in the reverse polarity direction (as hereinbefore discussed) and the current provided by the mutual inductance $L_m$ of commutating transformer $T_2$ is freewheeling through C1, SCR-3, SCR-1, $W_1$ and $W_2$. The magnitude of this freewheeling current $I_f$ is given by:

$$I_f = \frac{I_o}{\sqrt{2}}$$

This may be derived from energy considerations since the energy stored by the mutual inductance $L_m$ of commutating transformer $T_2$ will be substantially constant during the freewheeling. Since the welding current in winding $W_2$ at time $t_1$ is Io and that in $W_1$ is zero when the freewheeling begins by firing SCR-1 and SCR-3, Energy = Constant = $\tfrac{1}{2}L_m I_o^2$ Therefore during the freewheeling $$\tfrac{1}{2}L_m I_1^2 + \tfrac{1}{2}L_m I_2^2 = \tfrac{1}{2}L_m I_o^2$$

where $I_1$ is the current flow in $W_1$ and $I_2$ is the current flow in $W_2$ during the freewheeling.

It thus follows that:

$$I_1^2 + I_2^2 = I_o^2$$

Since $I_1$ and $I_2$ are the freewheeling current $I_f$, during the interval $t_2$ to $t_3$, $I_f^2 = I_1^2 = I_2^2$. Therefore, $$2I_f^2 = I_o^2$$

$$I_f = \frac{I_o}{\sqrt{2}}$$

during the interval $t_2$ to $t_3$.

During the freewheeling interval $t_2$ to $t_3$, the capacitor C1 is being charged by the freewheeling current at a constant rate. The voltage across the welding terminals 17 (electrode) and 18 (work) is $E_2 - \tfrac{1}{2} V_{C1}$ (polarity of the capacitor has reversed, i.e., negative capacitor voltage) and is linearly increasing at a constant rate as determined by $I_f$ and C1 until at time $t_3$ a voltage level $E_r$ (FIG. 4) is reached which will reignite the welding arc in the reverse polarity direction.

At this time $t_3$, the voltage across welding terminals 17 (electrode) and 18 (work) drops to the weld level $E_{arc}$ and the welding current rapidly ramps up in the reverse polarity direction. The slope of this current is given by:

$$di/dt = (E_2 - E_{arc} - \tfrac{1}{2}V_{C1}/L_3)$$

At time $t_4$, the value of the welding arc current is $I_o$ in the reverse polarity direction which is equal to the value of the welding arc current $I_o$ in the straight polarity direction at time $t_1$ when SCR-1 and SCR-2 were fired. As the welding arc current attempts to exceed $I_o$ in the reverse polarity direction at time $t_4$, SCR-3 becomes reverse biased and is turned off. Capacitor C1 now begins to charge in the opposite direction by current flow via diode D1 for the next commutation cycle.

The current continues to ramp upward during the time interval $t_4$ to $t_5$ at a lower rate given by:

$$di/dt = (E_2 - E_{arc})/(L_m + L_3)$$

It is to be noted that $L_3$ is very small compared to $L_m$.

At time $t_5$, $E_2 = E_{arc}$ and the slow upward ramp of the reverse polarity welding current $I_{rp}$ ceases.

During the time interval $t_4$ to $t_5$ energy or volt-seconds is being accumulated or stored in the mutual inductance $L_m$ of commutating transformer $T_2$ as indicated by the single cross-hatched area under the curve for $E_2$ for the interval $t_4$ to $t_5$ (FIG. 4).

At time $t_5$ ($E_2 = E_{arc}$ with $E_2$ decreasing), the mutual inductance $L_m$ of commutating transformer $T_2$ will induce a voltage to maintain the welding arc current in the reverse polarity direction. That is, the mutual inductance $L_m$ will induce a voltage to provide a welding current so as to resist any tendency of a change in flux. During the time interval $t_5$ to $t_6$, the welding current $I_{rp}$ slowly ramps down at a rate:

$$di/dt = (E_2 + E_{arc})/(L_m + L_3)$$

During this interval $t_5$ to $t_6$, the energy or volt-seconds previously stored in the mutual inductance $L_m$ is dissipated and induces sufficient voltage across winding $W_1$ of commutating transformer $T_2$ to maintain the reverse polarity current flow $I_{rp}$ in opposition to $E_2$. This energy expenditure is indicated by the double cross-hatched area under curve $E_2$ in the time interval $t_5$ to $t_6$ (FIG. 4). As before, $L_3$ is very small with respect to $L_m$ and may as a practical matter be ignored. It is to be noted that the value of the reverse polarity welding current $I_{rp}$ is the same, $I_o$, at times $t_4$ and $t_6$.

Upon the firing of SCR-2 at time $t_6$, the energy stored in the leakage reactance $L_3$ of step down transformer $T_1$ will induce a voltage to oppose the net voltage drop $V_{13-35}$ and attempt to maintain the flow of the welding current I in the reverse polarity direction. Again, since the energy storage capacity of the leakage reactance $L_3$ is small, the welding arc current will rapidly ramp from $I_o$ to zero in the time interval $t_6$ to $t_7$. The slope of this rapid current ramp in the time interval $t_6$ to $t_7$ is given by:

$$di/dt = (E_2 + E_{arc})/L_3$$

At time $t_6$, SCR-2 is fired or rendered conducting by fire control circuit means 20. A current path has thus been established around the loop SCR-1, $W_1$, $W_2$ and SCR-2 around which the current being induced by the mutual inductance $L_m$ of commutating transformer $T_2$ freewheels.

At time $t_7$, when the value of the reverse polarity welding current has reached zero, the arc will immediately reignite in the straight polarity welding current flow direction. This is because electrons readily flow from the welding electrode to the workpiece. The voltage across the welding terminals 17 (electrode) and 18 (work) at time $t_7$ reverses instantaneously as the arc reignites in the opposite direction.

At time $t_7$, the welding current begins to ramp rapidly in the increasing straight polarity direction with a slope given by:

$$di/dt = (E_2 - E_{arc})/L_3$$

At time $t_8$, the magnitude of the welding current $I_o$ in the straight polarity direction equals the magnitude of the welding current $I_o$ in the reverse polarity direction at time $t_6$ when SCR-2 was fired and as it tries to increase past $I_o$ SCR-1 will become back biased and turned off.

The current $I_{sp}$ continues to ramp in the increased straight polarity direction during the time interval $t_8$ to $t_9$ at a lower rate given by the equation:

$$di/dt = (E_2 - E_{arc})/(L_m + L_3)$$

As before, $L_3$ is very small relative to $L_m$ and may as a practical matter be ignored.

At time $t_9$, $E_2 = E_{arc}$ and the slow increasing ramp of straight polarity welding current $I_{sp}$ ceases.

During the time interval $t_8$ to $t_9$ energy or volt-seconds is again being accumulated in the mutual inductance $L_m$ of commutating transformer $T_2$ as indicated by the single cross-hatched area under the curve for $E_2$ for the interval $t_8$ to $t_9$ (FIG. 4).

At time $t_9$ ($E_2 = E_{arc}$ with $E_2$ increasing toward positive voltage), the mutual inductance $L_m$ of commutating transformer $T_2$ will dissipate energy and induce a voltage to maintain the welding arc current in the straight polarity direction. That is, the mutual inductance $L_m$ will induce a voltage to provide a welding current so as to resist any tendency in a change of flux. During the time interval $t_9$ to $t_{10}$, the welding current slowly ramps down at a rate:

$$di/dt = (E_2 + E_{arc})/(L_m + L_3)$$

During this interval $t_9$ to $t_{10}$, the energy or volt-seconds previously stored in the mutual inductance $L_m$ is expended and induces sufficient voltage across winding $W_2$ of commutating transformer $T_2$ to maintain the straight polarity current flow Isp in opposition to $E_2$. This energy expenditure is indicated by the double cross-hatched area under the curve $E_2$ in the time interval $t_9$ to $t_{10}$ (FIG. 4). As before, $L_3$ is very small with respect to $L_m$ and may as a practical matter be ignored. The value of the straight polarity current $I_{sp}$ at time $t_{10}$ is $I_o$ the same as at time $t_8$.

At time $t_{10}$, SCR-1 and SCR-3 are fired or rendered conducting and the cycle is repeated as hereinbefore described.

It is to be noted that it is not necessary to commutate or forcibly render non-conducting SCR-1 (the SCR permitting reverse polarity welding current flow $I_{rp}$) when SCR-2 is fired in order to establish straight polarity welding current flow $I_{sp}$ when the A.C. power source is supplying negative voltage. This is because the welding arc readily changes from reverse polarity to straight polarity welding current flow due to the fact that electrons readily flow from the welding electrode to the workpiece when the welding electrode has a negative potential with respect to the workpiece.

In accordance with the present invention, welding current flow is changed from straight polarity to reverse polarity when the A.C. power source is supplying positive voltage and by commutating or forcibly rendering non-conductive the welding current path permitting welding current flow in the straight polarity direction and by providing a current path for reverse polarity current. This results in the energy stored in mutual inductance $L_m$ of commutating transformer $T_2$ to cause the welding electrode to have a sufficient positive potential with respect to the workpiece (by means of charging capacitor C1 in a preferred embodiment) so that electrons are forced to flow from a aluminum, aluminum alloy or like metal workpiece to the electrode thereby establishing the welding arc and welding current flow in the reverse polarity direction. Accordingly, the welding power supply of the present inventin is self-stabilizing in that the energy stored in the welding power supply inductor means generates a potential between the welding electrode and the workpiece sufficient to force conduction of electrons from the workpiece to the welding electrode during switching of the welding current from straight to reverse polarity and thereby provides a stabilized welding art. This represents a significant improvement in the art of TIG arc welding of aluminum, aluminum alloys and like metals in that the present invention maintains a stable welding arc without the need for the disadvantageous use of high frequency starting voltage to induce electron and current flow in the reverse polarity direction.

In the preferred embodiment of the present invention hereinbefore described, the potential necessary to force conduction of electrons from the workpiece to the electrode is provided by the charging of capacitor C1 by the energy stored in mutual inductance $L_m$ of commutating transformer $T_2$. There is negligible energy loss to the mutual inductance $L_m$ over an entire 360° A.C. power supply voltage cycle since this energy is returned to the mutual inductance $L_m$ by the opposite charging of capacitor C1 by current flow through diode D1 when the reverse polarity current is established by the welding arc reversal and SCR-3 is shut off by the reverse polarity current flow.

It is important to note that in FIG. 4, the time interval $t_1$ to $t_4$ and $t_6$ to $t_8$ is greatly exaggerated with respect to, for example, the time interval $t_4$ to $t_6$ and $t_8$ to $t_{10}$ for purposes of aiding understanding of the circuit in accordance with the described preferred embodiment of the present invention. The magnitude of this exaggeration may be appreciated by considering that time interval $t_1$ to $t_4$ may typically be, for example, about 100 microseconds whereas time interval $t_4$ to $t_6$ may typically be, for example, about 8.3 milli-seconds.

It should also be noted that the inductor means or commutating transformer $T_2$ also acts as a filter to provide the quasi square wave welding current.

In FIG. 4, time $t_1$ (firing time for SCR-1 and SCR-3) and time $t_2$ (firing time for SCR-2) have approximately the same phase relative to their corresponding half cycles of line voltage $E_2$ and therefore result in a balanced or symmetrical welding current waveform I.

The firing time for SCR-2 need not have the same phase relative to the negative half cycle of the line voltage $E_2$ as the firing time for SCR-1 and SCR-3 relative to the preceding positive half cycle. The firing time of SCR-2 is adjustable by the fire control circuit means 20 and can be made equal to, earlier than, or later than the firing time for SCR-1 and SCR-3 with respect to their half cycle voltage phases. Similarly, the firing time for SCR-1 and SCR-3 can be varied by fire control circuit means 20 with respect to the phase angle of the positive half cycle of the waveform of line voltage $E_2$. It is required, however, that the firing time of SCR-1 and SCR-3 (which is substantially simultaneous) take place during the positive half cycle of line voltage $E_2$ and that the firing time for SCR-2 take place during the negative half cycle of line voltage $E_2$.

By varying the firing times of SCR-1 and SCR-2, the amplitude and polarity (half wave width) of the welding current waveform may be adjusted as will be hereinafter discussed.

Figure 5:
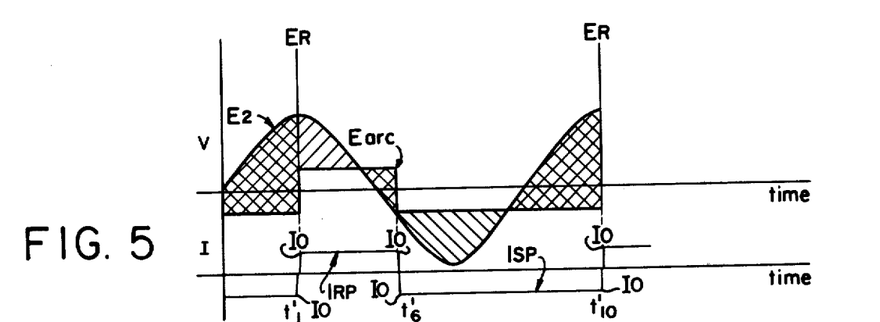
FIGS. 5 and 6 are graphs showing additional waveforms explanatory of the operation of the preferred embodiment of the welding supply in accordance with the present invention as illustrated in FIG. 1.

Referring to FIG. 5 and comparing it to FIG. 4, the firing time $t_1'$ for thyristor SCR-1 and commutating circuit means C has been moved later in time (i.e., to the right in the figure) with respect to the waveform of the line voltage $E_2$ in comparison with the firing time $t_1$, of SCR-1 and commutating circuit means C in FIG. 4. The firing time $t_6'$ for SCR-2 in FIG. 5 has been moved earlier in time (i.e., to the left in the figure) with respect to the waveform of the line voltage $E_2$ in comparison with the firing time $t_6$ for SCR-2 in FIG. 4. [It is to be noted that in FIG. 5 the time scale has not been expanded around the time of welding current reversal. An expanded time scale would result in curves at welding current reversal substantially similar to those in FIG. 4.]

For an SCR firing sequence as illustrated in FIG. 5, the width or time of the reverse polarity welding current half cycle $I_{rp}$ has been decreased whereas the width or time of the straight polarity welding current half cycle Isp has been increased. The single cross hatched area under curve $E_2$ again represents an increase or accumulation of energy storage in the mutual inductance Lm of commutating transformer $T_2$ and the double cross hatched area represents a decrease in energy storage. The increase and decrease of energy storage is equal for a full cycle of the waveform for the line voltage $E_2$. However, the energy storage increase and decrease are not equal for a given half cycle of the waveform for line voltage $E_2$.

FIG. 5 illustrates an unsymmetrical or unbalanced quasi square wave welding current waveform predominated by straight polarity welding current Isp. This will effect greater penetration of the workpiece since for straight polarity welding current (negative current) electrons are flowing from the electrode to the workpiece and thus these electrons are heating the metal workpiece for a relatively longer period of time and will thus cause a relatively deeper weld.

As before, the amplitude of the welding current Io just prior to and after the switching of current polarity will be equal due to the inductor means, e.g., commutating transformer $T_2$. The slowly increasing and decreasing welding current ramping will be present as hereinbefore described.

Figure 6:
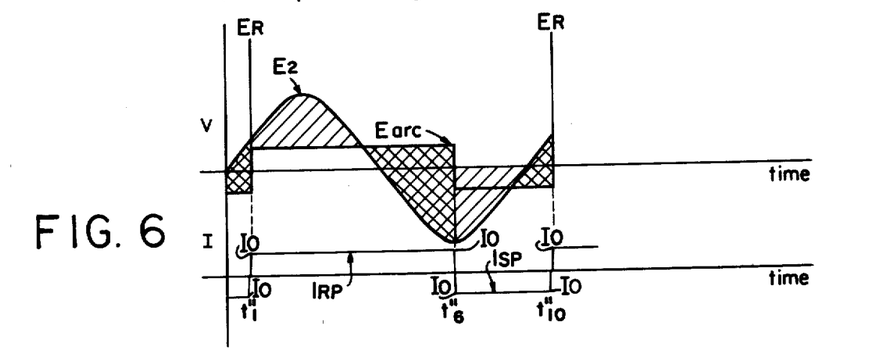

Referring to FIG. 6 and comparing it to FIG. 4, the firing time $t_1''$ for thyristor SCR-1 and commutating circuit means C has been moved earlier in time (i.e., to the left in the figure) with respect to the waveform of the line voltage $E_2$ in comparison with the firing time $t_1$ of SCR-1 and the commutating circuit means C in FIG. 4. The firing time $t_6''$ for SCR-2 in FIG. 6 has been mover later in time (i.e., to the right in the figure) with respect to the waveform of the line voltage $E_2$ in comparison with the firing time $t_6$ for SCR-2 in FIG. 4. [It is to be noted that in FIG. 6 the time scale has not been expanded around the time of welding current reversal. An expanded time scale would result in curves at welding current reversal substantially similar to those as in FIG. 4.]

For an SCR firing sequence as illustrated in FIG. 6, the width or time of the reverse polarity welding current half cycle $I_{rp}$ has been increased whereas the width or time of the straight polarity welding current half cycle Isp has been decreased. The single cross hatched area under curve $E_2$ again represents an an accumulation of energy in the mutual inductance Lm of commutating transformer $T_2$ and the double cross hatched area again represents a dissipation of energy. The increase and decrease of energy storage is equal for a full cycle of the waveform for the line voltage $E_2$. However, the energy storage increase and decrease are not equal for a given half cycle of the waveform for the line voltage $E_2$.

FIG. 6 illustrates an unsymmetrical quasi square wave welding current waveform predominated by reverse polarity welding current $I_{rp}$. This will effect greater cleaning of the workpiece since for reverse polarity welding current (positive current) electrons are flowing from the workpiece to the electrode and thus these electrons are removing oxide type particles for a relatively longer period of time.

As before, the amplitude of the welding current Io just prior to and after the switching of current polarity will be equal due to the inductor means, e.g., commutating transformer $T_2$. The slow increasing and decreasing welding current ramping will be present as hereinbefore described.

Figure 7:
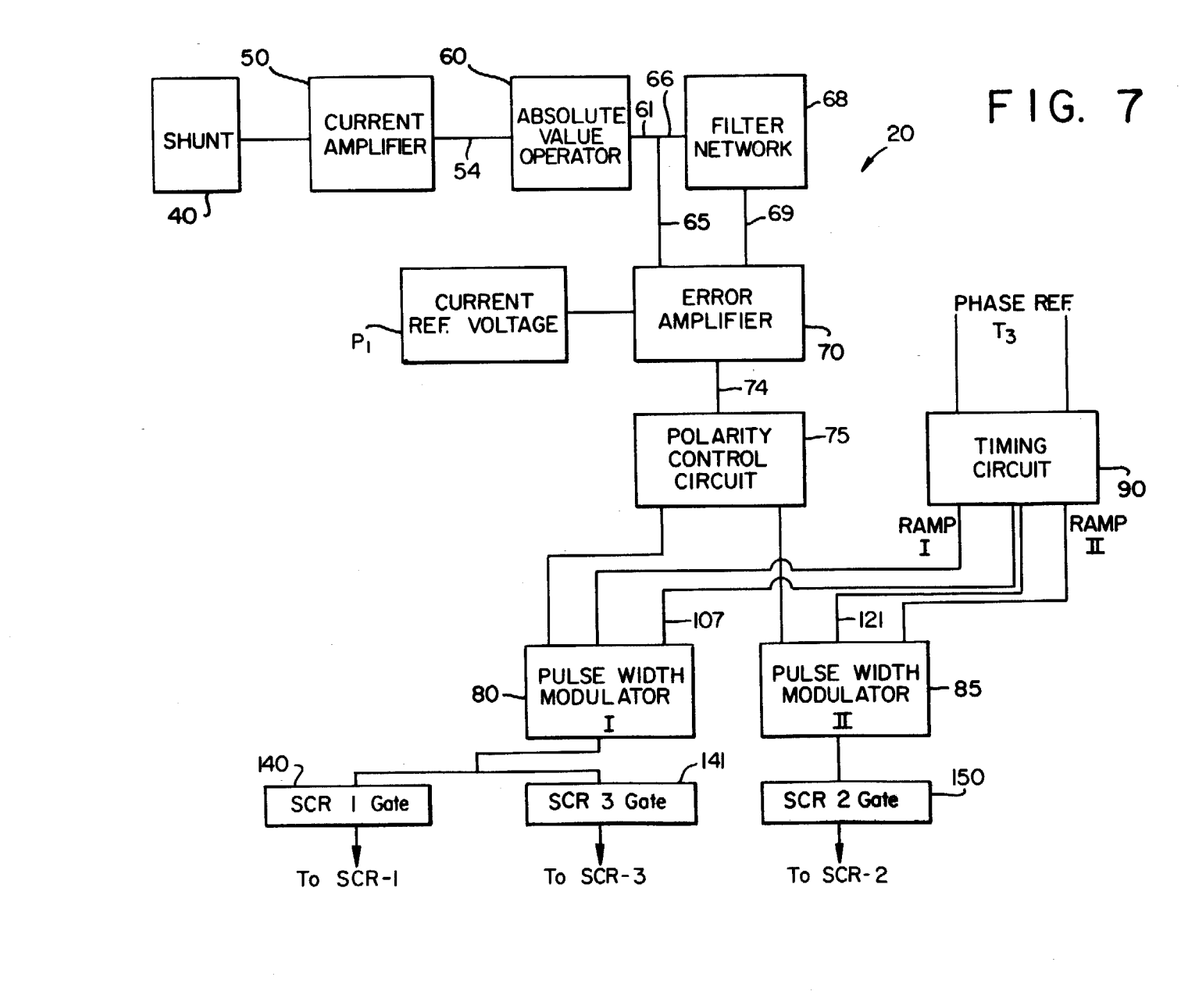
FIG. 7 is a block diagram of a thyristor firing control circuit means suitable for use in the preferred embodiment of the welding power supply in accordance with the present invention as illustrated in FIG. 1.
Figure 8:
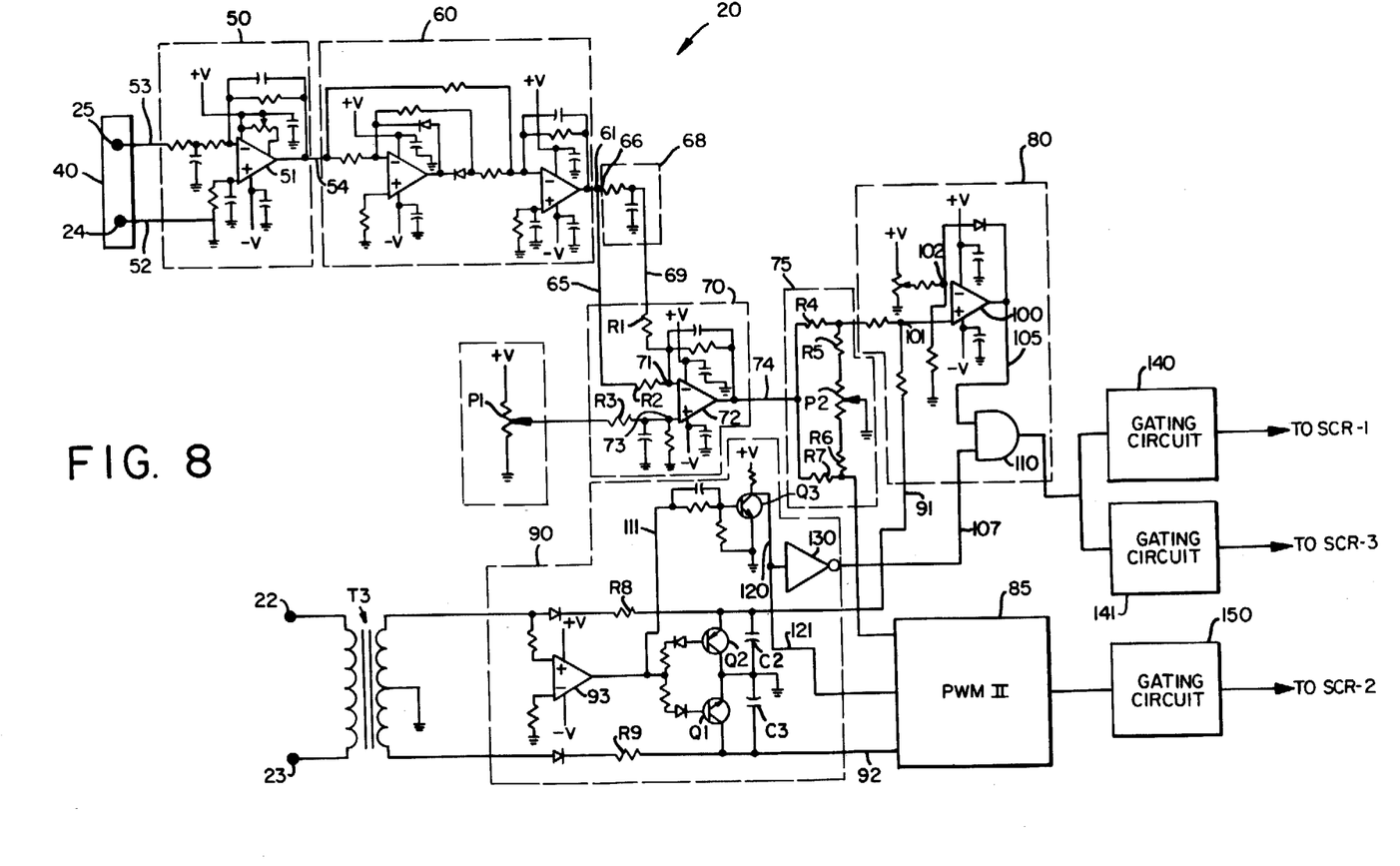
FIG. 8 is a schematic circuit diagram for the thyristor fire control circuit of FIG. 7.

A block diagram for a firing control circuit means 20 for use with the present invention is illustrated in FIG. 7 with an example of circuitry for the block diagram of FIG. 7 illustrated in FIG. 8.

Shunt 40 produces a welding current feedback signal 41 having a magnitude in the millivolt range which will be proportional to the welding current. The arc current feedback signal 41 is inputted to operational amplifier 51 of current feedback signal amplifier circuit 50 which outputs an amplified square wave feedback signal 54.

This amplified current feedback signal 54 is inputted into an absolute value operator circuit 60 which outputs a D.C. signal with positive polarity which coincides substantially in magnitude and phase with the welding arc current.

The output signal 61 of absolute value operator circuit 60 is inputted into parallel first feedback signal path 65 and second feedback signal path 66. The second feedback signal is inputted into filter network 68 which has a relatively long time constant and thus outputs a feedback signal 69 which is proportional to the welding arc current but is substantially non responsive to the fundamental ripple frequency of the arc current. The filter network time constant is suitably about 5 to 50 times the period of the fundamental arc current ripple.

The first and second feedback signals are inputted into current error amplifier circuit 70 and are weighted at a predetermined value and summed at the inverting input terminal 71 of differential input summing amplifier 72. The weight of the second feedback signal to the first feedback signal is the ratio of resistor R1 to R2 which is typically about 10:1. A positive D.C. reference potential is inputted to the non-inverting input terminal 73 of amplifier 72. The output signal 74 of amplifier 72 is a signal proportional to the difference between the summed first and second feedback signals and the reference potential. The voltage gain is substantially large (e.g., typically about 50) such that the steady state error (difference between the summed feedback signals and reference potential) is small and substantially vertical volt-ampere characteristics are achieved.

The second feedback error signal 69 having the relatively long time constant and thus being insensitive to transient welding arc current changes is the dominant feedback and results in firing control circuit means 20 not being overly sensitive to these transient welding arc current changes. The use of the first feedback error signal 65 which coincides substantially instantaneously in phase with the welding arc current provides for small corrections for instantaneous transient welding arc current changes.

The D.C. reference potential inputted to the non-inverting input terminal 73 of amplifier 72 is adjustable by potentiometer P1 which provides a means for varying the welding current (i.e., phase control, as will be hereinafter discussed). The higher the reference potential, the higher will be the welding current. Conversely, the lower this reference potential, the lower will be the welding current.

The error signal 74 outputted by current error signal amplifier 70 is inputted into polarity control circuit 75. Polarity control circuit 75 splits the error signal 74 into two parallel paths to input an error signal 76 to pulse width modulator I (80) and an error signal 77 to pulse width modulator II (85). In polarity control circuit 75, R4=R7 and R5=R6. Accordingly, adjustment of potentiometer P2 will vary the proportion of the error signal 74 which will be inputted to PWM-I (80) and PWM-II (85), respectively. Potentiometer P2 thus provides a means for varying the width or duration of the straight polarity and reverse polarity portions (i.e., polarity control) of the welding arc current as will hereinafter be discussed.

Pulse width modulator I (80) and pulse width modulator II (85) are each respectively provided with a ramp signal [ramp I (91) and ramp II (92)] from timing circuit 90 for reasons as will hereinafter be discussed. Timing circuit 90 is connected via transformer $T_3$ at 22 and 23 to the single phase AC power source across input terminals 11 and 12 of step down welding transformer $T_1$ (FIG. 1).

A signal which is in phase with the A.C. power source (i.e., in phase with $E_2$) is fed from $T_3$ to the zero crossing detector of timing circuit 90 which comprises operational amplifier 93 which outputs a bidirectional square wave signal which is in phase with the AC sine wave of the AC power supply (i.e., in phase with $E_2$). For a positive square wave output of amplifier 93, transistor Q-1 will be on which causes discharge of capacitor C-3 to ground. Transistor Q-2 will be off. The positive A.C. sine wave outputted from transformer T-3 will charge capacitor C-2 through resistor R8 whereby a modified cosine ramp signal 91 is generated (ramp-I signal 91) which is summed with error signal 76 (outputted by polarity control circuit 75) at the non-inverting input terminal 101 of operational amplifier 100 of pulse width modulator-I (80).

For a negative square wave output of amplifier 93, transistor Q-2 will be on which causes discharge of capacitor C-2 to ground. Transistor Q-1 will be off. The negative A.C. sine wave outputted from transformer T-3 will charge capacitor C-3 through resistor R9 whereby a modified cosine ramp signal 92 is generated (ramp-II signal 92) which is summed with the error signal 77 (outputted by the polarity control circuit 75) at the non-inverting terminal of the operational amplifier of pulse width modulator-II (85). [Circuit details of PWM-II (85) are not illustrated since they are substantially identical to PWM-I (80).]

A bias voltage is provided to the inverting input terminal 102 of operational amplifier 100 of pulse width modulator-I (80). A pulse width modulated unidirectional square wave or gating signal will be generated by operational amplifier 100 and outputted via lead 105 when the sum of the error control signal 76 (outputted by polarity control circuit 75) and the ramp I signal 91 exceed the bias signal. This gating signal is then inputted into AND-I 110.

The second input into AND-110 is a blanking pulse signal inputted via lead 107 which is generated by timing circuit 90 in the following manner. The hereinafter discussed bidirectional square wave signal outputted by operational amplifier 93 is fed via lead 111 and inputted to transistor Q-3 which outputs a unidirectional positive square wave blanking signal 120 which is 180° out of phase with the positive A.C. power source half cycle. Blanking signal 120 is fed into inverter 130 which outputs a unidirectional blanking pulse 107 which is in phase with the positive A.C. power source half cycle which is inputted into AND-1 110. Thus AND-I 110 will output a gating signal for SCR-1 and SCR-3 when the following two conditions are met: the A.C. power source is on positive half cycle (i.e., $E_2$ positive) and a signal is outputted by operational amplifier 100 of PWM-I (80).

Similarly, when the A.C. power source is on positive half cycle (i.e., $E_2$ positive) PWM-II 85 will be incapable of outputting a gating signal to SCR-3 due to zero signal to its AND gate via lead 121. (Signal 120 is 180° out of phase with the positive half cycle.)

For negative half cycles of the A.C. power source, the square wave blanking signal 120 is positive. Accordingly, invertor 130 will output zero signal via lead 107 to AND-I (110) and PWM-I (80) will be incapable of outputting a gating signal for SCR 1 and 3 for the negative half cycle of the A.C. power source (i.e., $E_2$ negative).

Similarly, when the A.C. power source is on negative half cycle, a positive square wave pulse will be inputted via lead 121 to the AND gate of PWM-II 85 and PWM-II 85 will be capable of outputting a gating signal to SCR-2.

Phase and polarity control of the welding arc current is accomplished in the following manner.

The ramp signal (which is summed with the error signal at the non inverting input terminal of the pulse width modulator operational amplifier) increases in voltage with an increase in phase angle of the A.C. power source voltage half cycle. Since the pulse width modulator will generate a gating signal when the summation exceeds the bias voltage inputted at the inverting input terminal of the amplifier, it will be apparent that the greater the error signal, the earlier in the half cycle of the A.C. power source voltage ($E_2$) an SCR gating signal will be outputted. The leading edge of the gating signal pulse represents the firing angle of the respective SCR, that is, the phase angle of the A.C. power source voltage ($E_2$) at which the respective SCR's fire.

Hence, adjusting potentiometer P2 (polarity control potentiemeter) to increase the error signal 76 inputted to PWM-I 80 and thus decrease the error signal 77 inputted to PWM-II 85 will result in SCR-1 and SCR-3 firing at an earlier phase angle of the positive half cycle of voltage $E_2$ and SCR-2 firing at a later phase angle of the negative half cycle of voltage $E_2$. Therefore, the reverse polarity half cycle width or duration of the welding arc current will increase and the straight polarity half cycle duration of the welding arc current will decrease.

Conversely, adjusting potentiometer P2 to decrease the error signal 76 inputted to PWM-I 80 and to increase the error signal 77 inputted to PWM-II 85 will decrease the reverse polarity half cycle duration of the welding arc current and the straight polarity half cycle duration of the welding arc current will increase. If the magnitude of the error signal 76 inputted into PWM-I 80 and the magnitude of the error signal 77 inputted into PWM-II are equal, the reverse polarity and straight polarity welding arc current half cycle widths will be equal. In all instances, the sum of the widths of adjacent pairs of reverse polarity (positive current) and straight polarity (negative current) welding arc current half cycles will equal 360° of the line voltage ($E_2$) frequency. As hereinbefore described, the blanking pulse signal 107 prevents SCR-1 and SCR-3 from being fired when voltage $E_2$ is in the negative half cycle and the blanking pulse signal 121 prevents SCR-2 from being fired when voltage $E_2$ is in the positive half cycle.

Phase control (or amplitude control) of the welding arc current is controlled by potentiometer P1. By adjusting potentiometer P1 to increase the reference potential inputted to the non inverting input terminal 73 of amplifier 72 of current error amplifier circuit 70, the magnitude of the error signal outputted by current error amplifier circuit 70 to polarity control circuit 75 is increased. Thus, regardless of the setting of potentiometer P2 of polarity control circuit 75, the error signal inputted to PWM-I 80 and PWM-II 85 both will increase by the same proportional amount. Thus, for a given setting for potentiometer P2, the firing angle for SCR-1 (SCR-3) and SCR-2 will be both equally earlier in time for the respective half cycles of voltage $E_2$. This will increase the amplitude of the welding arc current but will not change the widths of the reverse polarity and straight polarity welding current half cycles for the given selected setting for potentiometer P2.

Similarly, by adjusting potentiometer P1 to decrease the reference potential to current error amplifier circuit 70 with the setting on potentiometer P2 of polarity control circuit 75 remaining unchanged, the error signals inputted to PWM-I 80 and PWM-II 85 will both decrease proportionally and the firing angle for SCR-I (SCR-3) and SCR-2 will be both equally later in time. This will decrease the amplitude of the welding arc current but will not change the widths of the reverse polarity and straight polarity welding current half cycles for a given selected setting for polarity control potentiometer P2.

The gating signal for SCR-1 and SCR-3 outputted by PWM-I 80 is suitably coupled to SCR-1 and SCR-3, respectively, by a suitable isolated D.C. gating circuit 140 and 141. It is important that SCR-3 be gated by a short duration pulse which is initiated by the leading edge of the output gating signal pulse of PWM-I 80 and whose time duration is less than the time interval $t_1$ to $t_3$ of FIG. 4. This is to permit SCR-3 to be back biased and shut off in order to accomplish the hereinbefore described switching from straight polarity to reverse polarity welding arc current.

The gating signal for SCR-2 outputted by PWM-II is also suitably coupled to SCR-2 by a suitably isolated D.C. gating circuit 150.

Figure 9:
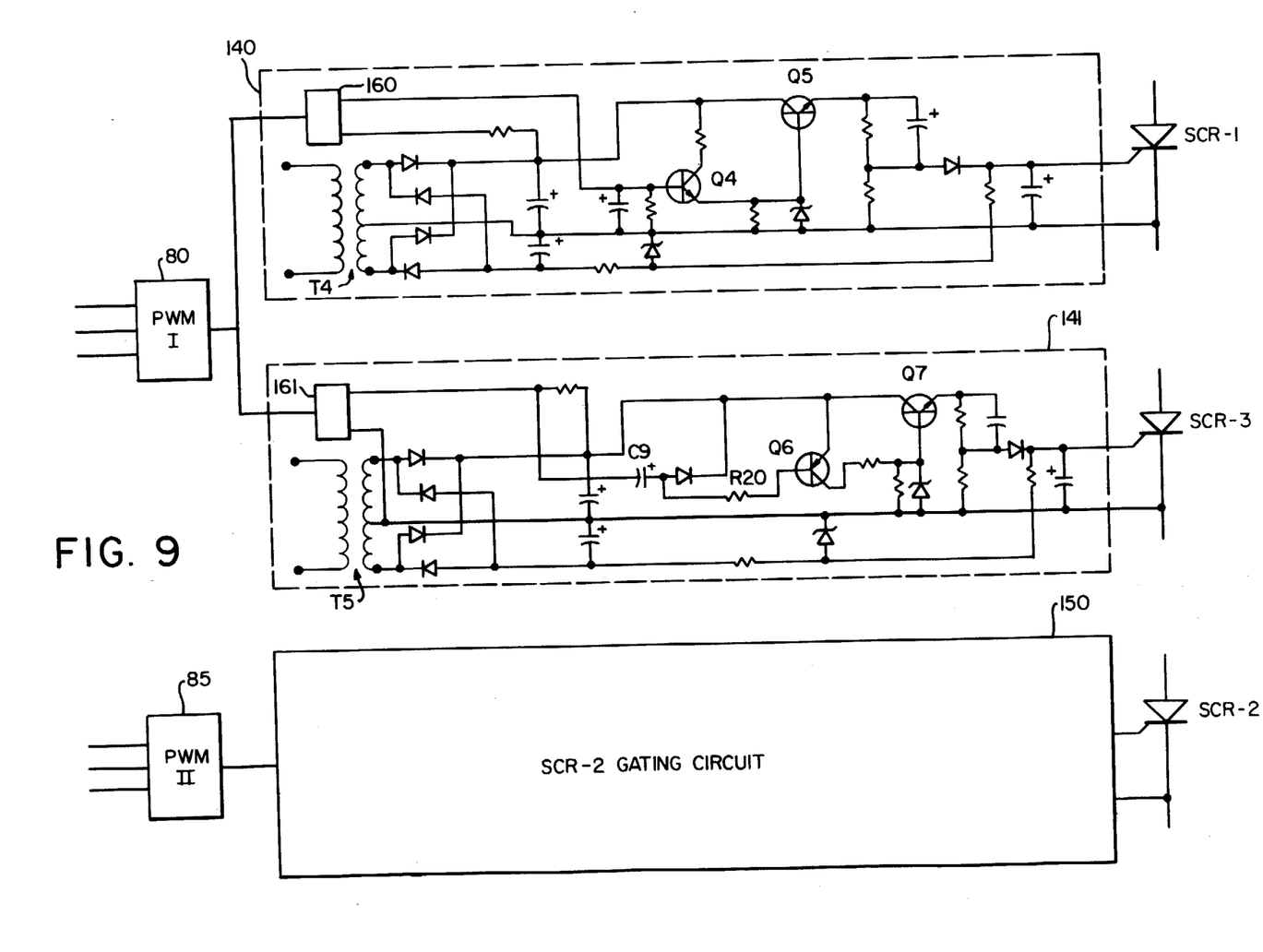
FIG. 9 is a schematic circuit diagram for a thyristor gating circuit suitable for use with the thyristor fire control circuit means of FIGS. 7 and 8.

An example of suitable gating circuits are illustrated in FIG. 9.

Referring to FIG. 9, the gating signal of PWM-I (80) is inputted to SCR-1 gating circuit 140 via photo coupled isolator 160 which may be, for example, a General Electric model H 11A1. This turns on transistors Q4 and Q5 which supply the firing pulse to the SCR-1 gate. When PWM-I (80) is not outputting a gating signal, Q4 and Q5 are off and gating circuit 140 is negatively biasing the gate of SCR-1 in order to make it less sensitive to transients. Power is supplied to gating circuit 140 by isolated center tap transformer $T_4$.

The gating signal of PWM-I (80) is inputted to SCR-3 gating circuit 141 via photo coupled isolator 161 which may also be, for example, a General Electric model H 11A1. This turns on transitors Q6 and Q7 which supply a firing pulse to the gate of SCR-3. When capacitor C-9 becomes fully charged transitor Q6 and hence Q7 will be turned off ending the firing pulse to SCR-3. The time constant of capacitor C-9 and resistor R-20 is used to control the duration of the hereinbefore discussed short time duration of the firing pulse for SCR-3. When transistors Q6 and Q7 are off, gating circuit 141 is negatively biasing the gate of SCR-3 in order to make it less sensitive to transients.

Gating circuit 150 for SCR-2 is substantially similar to gating circuit 140 for SCR-1.

The gating circuits of FIG. 9 are shown by way of example. Other types of gating circuits could be readily employed by one skilled in the art.

The foregoing firing control circuit means is described by way of example. Other fire control circuit means may be employed by one skilled in the art.

Figure 10:
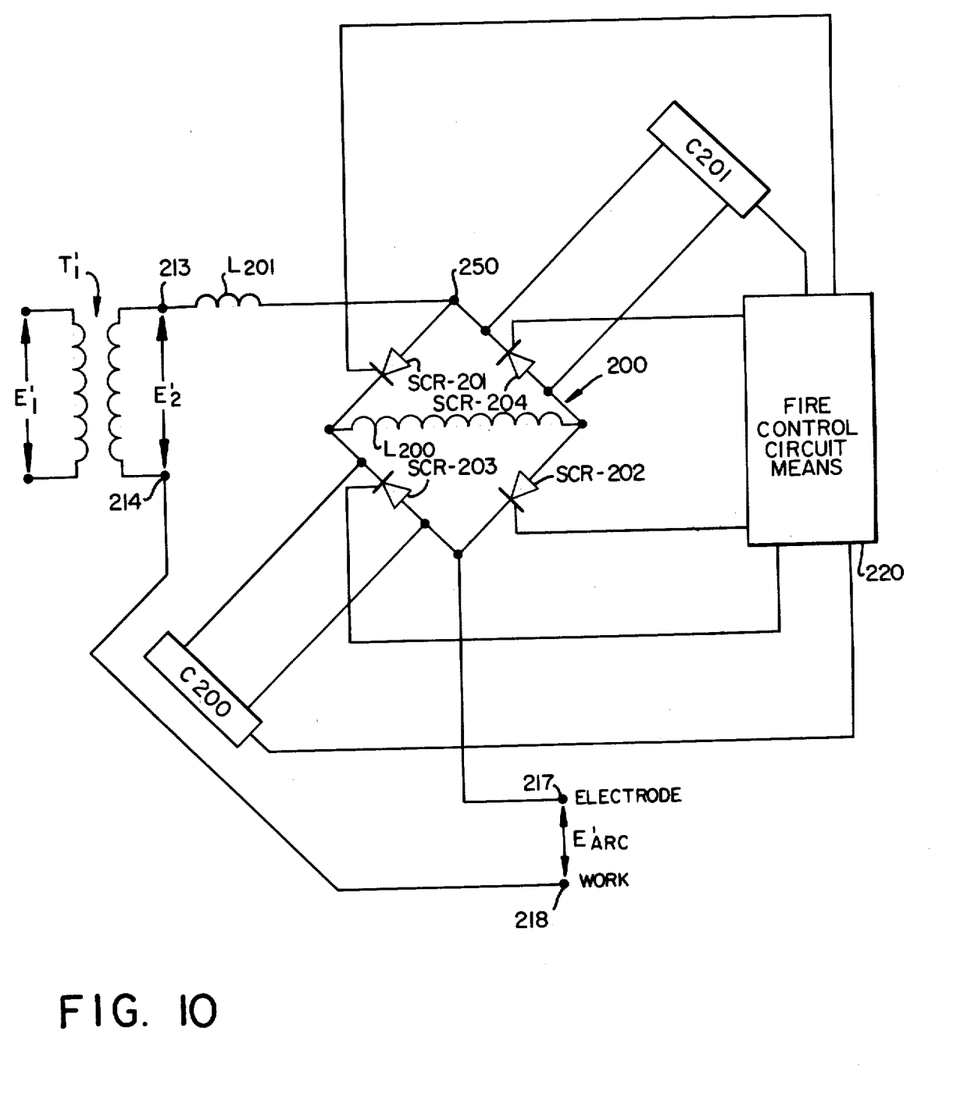
FIG. 10 is a schematic circuit diagram of an alternate embodiment of the welding power supply in accordance with the present invention.

FIG. 10 illustrates a circuit for an alternate embodiment of the welding power supply in accordance with the present invention.

The circuit of FIG. 10 comprises a controlled SCR rectifier bridge 200 connected in series with output terminal 213 of step down transform $T_1'$ and welding electrode terminal 217. The work to be welded is connected to terminal 218 and is in series with output terminal 214 of step down transormer $T_1'$. The welding arc $E_{arc}$ is formed between terminals 217 and 218.

A reverse polarity welding current path is provided by SCR-201, inductor means $L_{200}$, and SCR-202 by the selective firing of SCR-201 and SCR-202 by firing control circuit means 220. A straight polarity welding current path is provided by SCR-203, inductor means $L_{200}$ and SCR-204 by the selective firing of SCR-203 and SCR-204 by firing control circuit means 220. Either straight polarity or reverse polarity welding current will flow in the same direction through inductor means $L_{200}$. Accordingly, one skilled in the art will appreciate that the inductance of inductor means $L_{200}$ will function in the circuit of FIG. 10 in a substantially similar manner as the mutual reactance Lm of commutating transformer $T_2$ of FIG. 1 as hereinbefore described.

The circuit of FIG. 10 is also provided with a commutating circuit means C200 across SCR-203 cathode to anode and a commutating circuit means C201 across SCR-204 cathode to anode. Commutating circuit means C200 and C201 are also controlled by firing control circuit means 200. Commutating circuit means C200 and C201 would advantageously be of the same type as commutating circuit means C hereinbefore discussed and illustrated in FIG. 3.

The circuit of FIG. 10 operates as follows, substantially similar to the operating of the hereinbefore described circuit of FIG. 1.

Assume a straight polarity welding current flow with SCR-203 and SCR-204 conducting and the inductance of inductor means including a voltage to maintain the welding current with the welding arc $E_{arc}$ voltage exceeding the line voltage $E_2'$. [As hereinbefore described with respect to the mutual inducance Lm of commutating transformer $T_2$, the inductance of inductor means $L_{200}$ is dissipating energy accumulated when the line voltage $E_2'$ exceeded the welding arc potential $E_{arc}$.] At a selected time, SCR-201, SCR-202, commutating circuit means C200 and commutating circuit means C201 are fired substantially simultaneously. Commutating circuit means 200 applies a voltage across SCR-203 cathode to anode reverse biasing SCR-203 to render SCR-203 non conducting. Commutating circuit means 201 applies a voltage across SCR-204 cathode to anode reverse biasing SCR-204 to render SCR-204 non conducting. SCR-201 and SCR-202 are rendered conducting thus providing a reverse polarity current path. As before, the energy stored in inductor means $L_{200}$ will induce a voltage level (see, e.g., $E_r$ of FIG. 4) to reignite the welding arc in the reverse polarity direction. Commutating circuit means are not required for SCR-201 and SCR-202 to reverse welding current flow from the reverse polarity to the straight polarity direction for the reasons hereinbefore described.

The welding power supply described in conjunction with FIG. 1 is preferred in that it is simpler in that only two SCR's are required to perform the function requiring four SCR's for the welding power supply described in conjunction with FIG. 10 and in that only one SCR needs to be commutated rather than two.

Although preferred embodiments of the present invention have been described in detail, it is contemplated that modifications may be made and that some features may be employed without others, all within the spirit and scope of the invention.

What is claimed is:

1. In a controllable power supply for supplying quasi square waves of alternating current to a welding arc between an electrode and a workpiece comprising:

a transformer including a primary winding for receiving a single phase A.C. current from a single phase A.C. power source and at least one secondary winding;

a first welding current path established between opposite ends of said secondary winding which is nonconductive for current flow from said workpiece to said electrode and having switching means for selectively rendering said first current path conductive for current flow from said electrode to said workpiece;

a second welding current path established between opposite ends of said secondary winding which is nonconductive for current flow from said electrode to said workpiece and having switching means for selectively rendering said second current path conductive for current flow from said workpiece to said electrode;

control means for triggering said first current path switching means for said rendering of said first current path conductive at a selected non-zero value of a positive polarity half cycle of the source voltage when said welding current is flowing from said workpiece to said electrode in said second current path and said first current path is nonconductive;

control means for triggering said second current path switching means for said rendering of said second current path conductive at a selected non-zero value of a negative polarity half cycle of the source voltage when said welding current is flowing from said electrode to said workpiece in said first current path and said second current path is nonconductive;

means for rendering said first current path nonconductive operating substantially simultaneously with said selective triggering of said second current path switching means;

wherein said control means renders said first and second current paths alternately conducting at each adjacent positive and negative polarity half cycle of the source voltage for supplying current in respectively opposite and mutually exclusive polarities to said arc;

inductor means connected in said first and second current paths such that when current is flowing from said electrode to said workpiece in said first current path said inductor means accumulates energy when the voltage across said opposite ends of said first current path secondary winding is greater than the welding arc voltage and dissipates accumulated energy when the voltage across said opposite ends of said first current path secondary winding is less than the welding arc voltage for self-inducing voltage to maintain current flow from said electrode to said workpiece and when current is flowing from said workpiece to said electrode in said second current path said inductor means accumulates energy when the voltage across said opposite ends of said second current path secondary winding is greater than the welding arc voltage and dissipates accumulated energy when the voltage across said opposite ends of said second current path secondary winding is less than the welding arc voltage for self-inducing voltage to maintain current flow from said workpiece to said electrode;

wherein the energy accumulated by said inductor means substantially equals the energy dissipated by said inductor means over a 360° cycle of said source voltage;

the improvement which comprises:

commutating means for selectively rendering said second current path nonconductive whereby said inductor means accumulated energy provides a voltage across said electrode and said workpiece sufficient for reestablishing current flow from said electrode to said workpiece; and control means for initiating said selective operation of said commutating means substantially simultaneously with said selective triggering of said first current path switching means.

2. In a power supply as recited in claim 1, the improvement which further comprises:

said inductor means comprising a first winding in said first welding current path and a second winding in said second welding current path wherein said first and second windings are wound on a common core such that the coefficient of coupling between the inductance of said first winding and the inductance of said second winding is substantially one and such that a current flowing in said first winding of said first welding current path provides a magnetic flux having the same direction as a magnetic flux provided by a current flowing in said second winding of said second welding current path.

3. In a power supply as recited in claims 1 or 2, the improvement which further comprises:

said first welding current path switching means including at least one thyristor;

said second welding current path switching means including at least one thyristor; with said commutating means being connected across said second welding current path thyristor cathode to anode.

4. In a power supply as recited in claim 2, the improvement which further comprises:

said first welding current path switching means including only one thyristor;

said second welding current path switching means including only one thyristor; with said commutating means being connected across said second welding current path thyristor cathode to anode.

5. In a controllable power supply for supplying quasi square waves of alternating current to a welding arc between an electrode and a workpiece comprising:

a transformer including a primary winding for receiving a single phase A.C. current from a single phase A.C. power source and at least one secondary winding;

a first welding current path established between opposite ends of said secondary winding including at least one thyristor oriented in said first current path for preventing current flow from said workpiece to said electrode and for selectively rendering said first current path conductive for current flow from said electrode to said workpiece;

a second welding current path established between opposite ends of said secondary winding including at least one thyristor oriented in said second current path for preventing current flow from said electrode to said workpiece and for selectively rendering said second current path conductive for current flow from said workpiece to said electrode;

control means for firing said first current path thyristor for said rendering of said first current path conductive at a selected non-zero value of a positive polarity half cycle of the source voltage when said welding current is flowing from said workpiece to said electrode in said second current path and said first current path is nonconductive;

control means for firing said second current path thyristor for said rendering of said second current path conductive at a selected non-zero value of a negative polarity half cycle of the source voltage when said welding current is flowing from said electrode to said workpiece in said first current path and said second current path is nonconductive whereby the non-zero value of negative polarity voltage across opposite ends of said first current path secondary winding renders said first current path thyristor nonconductive and the non-zero value of negative polarity voltage across opposite ends of said second current path secondary winding establishes current flow from said workpiece to said electrode;

wherein said control means renders said first and second current paths alternately conducting at each adjacent positive and negative polarity half cycle of the source voltage for supplying current respectively opposite and mutually exclusive polarities to said arc;

inductor means connected in said first and second current paths such that when current is flowing from said electrode to said workpiece in said first current path said inductor means accumulates energy when the voltage across said opposite ends of said first current path secondary winding is greater than the welding arc voltage and dissipates accumulated energy when the voltage across said opposite ends of said first current path secondary winding is less than the welding arc voltage for self-inducing voltage to maintain current flow from said electrode to said workpiece and when current is flowing from said workpiece to said electrode in said second current path said inductor means accumulates energy when the voltage across said opposite ends of said second current path secondary winding is greater than the welding arc voltage and dissipates accumulated energy when the voltage across said opposite ends of said second current path secondary winding is less than the welding arc voltage for self-inducing voltage to maintain current flow from said workpiece to said electrode;

wherein the energy accumulated by said inductor means substantially equals the energy dissipated by said inductor means over a 360° cycle of said source voltage;

the improvement which comprises:

commutating means connected across said second current path thyristor cathode to anode for selectively rendering said second current path thyristor and thereby said second current path nonconductive whereby said inductor means accumulated energy provides a voltage across said electrode and said workpiece sufficient for reestablishing current flow from said electrode to said workpiece; and control means for initiating said selective operation of said commutating means substantially simultaneously with said selective firing of said first current path thyristor.

6. In a power supply as recited in claim 1, the improvement which further comprises:

said inductor means comprising a first winding in said first welding current path and a second winding in said second welding current path wherein said first and second windings are wound on a common core such that the coefficient of coupling between the inductance of said first winding and the inductance of said second winding is substantially one and such that a current flowing in said first winding of said first welding current path provides a magnetic flux having the same direction as a magnetic flux provided by a current flowing in said second winding of second welding current path.

7. In a power supply as recited in claims 5 or 6, the improvement which further comprises said first welding current path having only one thyristor and said second welding current path having only one thyristor.

8. A power supply as recited in claims 1 or 5 wherein said transformer has only one secondary winding.

9. A power supply as recited in claims 1, 2, 5 or 6 which further comprises means for independently selecting said non-zero values of said positive and negative source voltage half cycles such that said values have different phases relative to their respective source voltage half cycles whereby the corresponding positive and negative half cycles of arc current have different durations to provide an unbalanced power supply.

* * * * *